(12) United States Patent
Hori et al.

(10) Patent No.: US 9,873,832 B2
(45) Date of Patent: Jan. 23, 2018

(54) PHOSPHOR SHEET

(71) Applicant: Dexerials Corporation, Shinagawa-ku, Tokyo (JP)

(72) Inventors: Tomomitsu Hori, Utsunomiya (JP); Yasushi Ito, Utsunomiya (JP)

(73) Assignee: Dexerials Corporation, Shinagawa-ku, Tokyo (JP)

( * ) Notice: Subject to any disclaimer, the term of this patent is extended or adjusted under 35 U.S.C. 154(b) by 0 days.

(21) Appl. No.: 14/896,717

(22) PCT Filed: Jun. 17, 2014

(86) PCT No.: PCT/JP2014/065976
§ 371 (c)(1),
(2) Date: Dec. 8, 2015

(87) PCT Pub. No.: WO2014/203874
PCT Pub. Date: Dec. 24, 2014

(65) Prior Publication Data
US 2016/0137918 A1    May 19, 2016

(30) Foreign Application Priority Data

Jun. 18, 2013   (JP) ................. 2013-127420

(51) Int. Cl.
*F21V 9/16* (2006.01)
*F21K 99/00* (2016.01)
(Continued)

(52) U.S. Cl.
CPC ............ *C09K 11/7731* (2013.01); *B32B 3/06* (2013.01); *B32B 7/12* (2013.01); *B32B 27/20* (2013.01);
(Continued)

(58) Field of Classification Search
CPC ...... B32B 2307/422; B32B 2307/7246; B32B 2457/202; B32B 7/12; B32B 27/286;
(Continued)

(56) References Cited

U.S. PATENT DOCUMENTS 3,376,453 A * 4/1968 Leach .................... H05B 33/00
313/509
2004/0200973 A1* 10/2004 Ogawa ................... G01T 1/161
250/370.11

(Continued)

FOREIGN PATENT DOCUMENTS

CN          102241977 A      11/2011
EP           1939893 A2       7/2008
(Continued)

OTHER PUBLICATIONS

Sep. 30, 2014, International Search Report issued in International Patent Application No. PCT/JP2014/065976.
(Continued)

*Primary Examiner* — Sophie Hon
(74) *Attorney, Agent, or Firm* — Kenja IP Law PC

(57) ABSTRACT

Provided is a phosphor sheet that, despite its simplified structure, is capable of preventing deterioration in phosphors. In one of embodiments, the phosphor sheet includes moisture vapor barrier films 12 and 13 and a phosphor layer 11 that is sandwiched between the moisture vapor barrier films 12 and 13 and that includes a sulfide-based phosphor. Each of the moisture vapor barrier films 12 and 13 has an edge portion that is sealed by a cover member 14. The above structure prevents moisture vapor from entering the phosphor layer 11 from the edge portions of the moisture vapor barrier films 12 and 13, and accordingly, prevents deterioration in the phosphor(s) included in the phosphor layer 11.

12 Claims, 12 Drawing Sheets

(51) Int. Cl.
    *C09K 11/77*     (2006.01)
    *B32B 7/12*     (2006.01)
    *B32B 27/20*     (2006.01)
    *B32B 27/28*     (2006.01)
    *B32B 3/06*     (2006.01)
    *C09K 11/02*     (2006.01)
    *G02F 1/1335*     (2006.01)
    *F21K 9/64*     (2016.01)
    *F21Y 115/10*     (2016.01)

(52) U.S. Cl.
    CPC ............ *B32B 27/286* (2013.01); *C09K 11/02* (2013.01); *C09K 11/7734* (2013.01); *F21K 9/64* (2016.08); *F21V 9/16* (2013.01); *G02F 1/1336* (2013.01); *B32B 2307/422* (2013.01); *B32B 2307/7246* (2013.01); *B32B 2457/202* (2013.01); *F21Y 2115/10* (2016.08); *G02F 2001/133614* (2013.01)

(58) Field of Classification Search
    CPC ..... F21Y 2115/10; G02F 2001/133614; F21V 9/16; F21K 9/64
    See application file for complete search history.

(56) References Cited

U.S. PATENT DOCUMENTS

| | | | | |
|---|---|---|---|---|
| 2009/0167164 A1* | 7/2009 | Fukuda | ................... | C09D 1/00 313/504 |
| 2010/0187975 A1* | 7/2010 | Tsukahara | ............ | G02B 6/0038 313/503 |
| 2011/0002140 A1* | 1/2011 | Tsukahara | ............ | G02B 5/0236 362/602 |
| 2012/0113672 A1* | 5/2012 | Dubrow | ................. | B82Y 20/00 362/602 |
| 2014/0029238 A1 | 1/2014 | Ito et al. | | |

FOREIGN PATENT DOCUMENTS

| | | |
|---|---|---|
| JP | H06-58440 A | 3/1994 |
| JP | 2002-042525 A | 2/2002 |
| JP | 2004-012413 A | 1/2004 |
| JP | 2005-108635 A | 4/2005 |
| JP | 2005-351748 A | 12/2005 |
| JP | 2006-098239 A | 4/2006 |
| JP | 2006-126109 A | 5/2006 |
| JP | 2007-085797 A | 4/2007 |
| JP | 2009-283438 A | 12/2009 |
| JP | 2009-283441 A | 12/2009 |
| JP | 2010-225373 A | 10/2010 |
| JP | 2011-013567 A | 1/2011 |
| JP | 2013-047324 A | 3/2013 |
| JP | 2014199831 A | 10/2014 |
| RU | 2468472 C2 | 11/2012 |
| WO | 2013005792 A1 | 1/2013 |
| WO | 2013/024684 A1 | 2/2013 |

OTHER PUBLICATIONS

Jun. 9, 2015, Notification of Reasons for Refusal issued by the Japan Patent Office in the corresponding Japanese Patent Application No. 2013-127420.

Jul. 13, 2016, Office Action issued by the State Intellectual Property Office in the corresponding Chinese Patent Application No. 201480034903.X.

Apr. 25, 2017, Office Action issued by the Federal Service for Intellectual Property, Patents and Trademarks of the Russian Federation in the corresponding Russian Patent Application No. 20151530532.

Mar. 14, 2017, Notification of Reasons for Refusal issued by the Korean Intellectual Property Office in the corresponding Korean Patent Application No. 10-2015-7034491.

Mar. 20, 2017, Extended European Search Report issued by the European Patent Office in the corresponding European Patent Application No. 148146131.7.

* cited by examiner

PHOSPHOR SHEET

TECHNICAL FIELD

The present disclosure relates to a phosphor sheet that is used, for example, in a backlight source of a liquid crystal display or the like. The present disclosure is based on and claims the priority of Japanese Patent Application No. 2013-127420 filed in Japan on Jun. 18, 2013, which is herein incorporated by reference.

BACKGROUND

In liquid crystal displays, a backlight source is used to illuminate through a liquid crystal panel from behind. In recent years, upsizing, thinning, weight reduction, longer life, or the like of liquid crystal displays, as well as the effort to improve video quality using blink control, have brought increasing attention to a light emitting device including a plurality of Light Emitting Diodes (LEDs) arranged on a substrate for surface emission. In such a light emitting device, the following two methods are mainly used to produce white light.

The first method to produce white light is to arrange LEDs each having R (red), G (green), and B (blue) three colors and to produce white light by synthesizing light beams in the three colors by lighting the LEDs simultaneously. The second method is to coat, for example, a blue LED with a phosphor-containing resin to convert blue color into white color. The structure including the blue LED coated with the phosphor-containing resin is called "white LED".

Here, the first method is expensive because of the need to use LEDs in the three colors of R, G, and B. The second method also has a difficulty in forming the phosphor-containing resin regularly and evenly, because the phosphor-containing resin is potted in a small area of the LED.

Accordingly, as a substitute for the second method, the third method of converting colors by using a blue LED, together with a phosphor-containing resin sandwiched between sheet substrates or with a phosphor-containing sheet made of a phosphor-containing resin in the form of a sheet, is gaining attention. (Refer to Patent Literatures 1 and 2, for example.)

Some phosphors are susceptible to oxygen and moisture vapor. For example, sulfide phosphors, such as $SrGa_2S_4$:Eu, CaS:Eu, and SrS:Eu, have a sharp light emission spectrum and accordingly, are excellent phosphor materials that allow reproduction of a broad range of colors, and $(Ba,Sr)_3SiO_5$:Eu is a high brightness orange light emitting phosphor material. However, these phosphor materials are prone to deterioration under a high temperature and high humidity environment due to moisture vapor.

When these phosphors are in use, some sort of measures need to be taken to block moisture vapor. Although these phosphors can be hardly adopted for white LEDs mentioned in the above second method, measures may be still taken for the third method by, for example, covering a phosphor layer with a moisture vapor barrier film. For example, there have been proposed a method of providing, on a phosphor-containing resin, a protective layer of a silicon compound or the like (refer to Patent Literature 3) and a method of forming a moisture vapor barrier layer on a surface of a phosphor-containing resin (refer to Patent Literatures 4 and 5).

CITATION LIST

Patent Literatures

PTL1: JP2005108635A
PTL2: JP2009283438A
PTL3: JPH0658440A
PTL4: JP2009283441A
PTL5: JP2011013567A

SUMMARY

Technical Problem

Nevertheless, even with the aforementioned measures taken to block moisture vapor, moisture vapor is likely to enter from an edge portion, and this often leads to deterioration in phosphors.

The present disclosure has been conceived in view of the above circumstance, and the present disclosure is to provide a phosphor sheet that, despite its simplified structure, is capable of preventing deterioration in phosphors.

Solution to Problem

In one of aspects for solving the aforementioned problem, the present disclosure provides a phosphor sheet including: moisture vapor barrier films; and the first phosphor layer sandwiched between the moisture vapor barrier films, wherein each moisture vapor barrier film has an edge portion that is sealed by a cover member.

In another aspect, the present disclosure provides a lighting device including the phosphor sheet.

In yet another aspect, the present disclosure provides a liquid crystal display device including the phosphor sheet.

Advantageous Effect

According to the present disclosure, since the edge portions of the moisture vapor barrier films are sealed by the cover member, moisture vapor is prevented from entering the phosphor layer from the edge portions of the moisture vapor barrier films, and accordingly, deterioration in phosphor(s) included in the phosphor layer is prevented.

DETAILED DESCRIPTION

Preferred embodiments according to the present disclosure will be described in detail below in the following order with reference to the drawings.
1. Phosphor Sheet
2. Lighting Device
3. Examples 1. Phosphor Sheet A phosphor sheet according to one of embodiments includes: moisture vapor barrier films; and the first phosphor layer sandwiched between the moisture vapor barrier films. Each moisture vapor barrier film has an edge portion that is sealed by a cover member. The above structure prevents moisture vapor from entering the phosphor layer from the edge portions of the moisture vapor barrier films, and accordingly, prevents deterioration in phosphor(s) included in the phosphor layer.

First Structural Example

Figure 1:
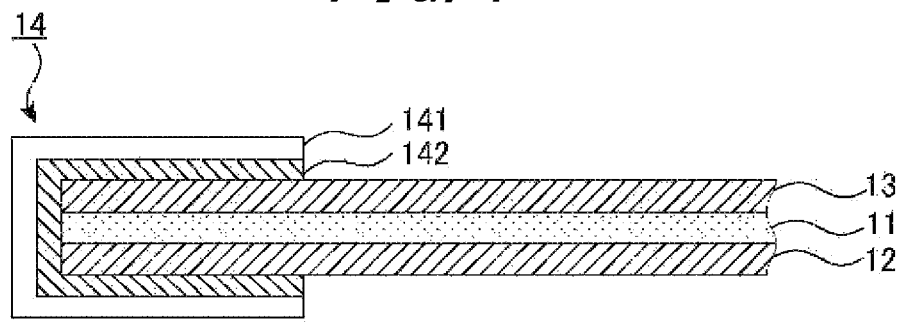
FIG. 1 illustrates the first structural example of an edge portion of a phosphor sheet.

FIG. 1 illustrates the first structural example of an edge portion of a phosphor sheet. The illustrated phosphor sheet includes a phosphor layer 11 that is sandwiched between the first moisture vapor barrier film 12 and the second moisture vapor barrier film 13.

The phosphor layer 11 constitutes the first phosphor layer and is obtained by forming a powdered phosphor-containing resin composition into a film. Materials of the phosphor are not limited to any particular type, and any of a sulfide-based phosphor, an oxide-based phosphor, a nitride-based phosphor, a fluoride-based phosphor, or the like may be used alone or in combination of two or more in accordance with type, absorption band, emission band, or the like of the phosphor. Concrete examples of the sulfide-based phosphor include $CaS:Eu$, $SrS:Eu$, $SrGa_2S_4:Eu$, $CaGa_2S_4:Eu$, $(Sr,Ca,Ba,Mg)Ga_2S_4:Eu$, $(Sr,Ca,Ba)S:Eu$, $Y_2O_2S:Eu$, $La_2O_2S:Eu$, $Gd_2O_2S:Eu$, and the like. Concrete examples of the oxide-based phosphor include $(Ba,Sr)_3SiO_5:Eu$, $(Ba,Sr)_2SiO_4:Eu$, $Tb_3Al_5O_{12}:Ce$, $Ca_3Sc_2Si_3O_{12}:Ce$, and the like. Concrete examples of the nitride-based phosphor include $Ca_2Si_5N_8:Eu$, $Sr_2Si_5N_8:Eu$, $Ba_2Si_5N_8:Eu$, $(Ca,Sr,Ba)_2Si_5N_8:Eu$, $Ca_x(Al,Si)_{12}(O,N)_{16}:Eu$ $(0<x\leq1.5)$, $CaSi_2O_2N_2:Eu$, $SrSi_2O_2N_2:Eu$, $BaSi_2O_2N_2:Eu$, $(Ca,Sr,Ba)Si_2O_2N_2:Eu$, $CaAl_2Si_4N_8:Eu$, $CaSiN_2:Eu$, $CaAlSiN_3:Eu$, and the like. Concrete examples of the fluoride-based phosphor include $K_2TiF_6:Mn^{4+}$, $Ba_2TiF_6:Mn^{4+}$, $Na_2TiF_6:Mn^{4+}$, $K_3ZrF_7:Mn^{4+}$, $K_2SiF_6:Mn^{4+}$, and the like. Other examples of the phosphor include a YAG phosphor, such as $(Y,Gd)_3(Al,Ga)_5O_{12}:Ce(YAG:Ce)$, and a sialon phosphor, such as $Lu(Si,Al)_{12}(O,N)_{16}:Eu$. In the description of each phosphor material, a substance preceding a colon (:) symbol indicates a parent body, and a substance following the colon symbol indicates an activator.

As phosphor(s) that may be used for producing white light by using a blue LED or a near-ultraviolet LED, a yellow phosphor, a combination of yellow and red phosphors, a combination of green and red phosphors, or the like may be adopted. In the present embodiment, a sulfide-based phosphor, an oxide-based phosphor, or a combination of these phosphors, which are prone to deterioration due to moisture vapor, may be preferably used to achieve a broad range of colors.

Examples of the sulfide-based phosphor that may be used for producing white light by using a blue LED include a sulfide-based phosphor, preferably such as $CaS:Eu$ and $SrS:Eu$, that emits red fluorescence having a peak wavelength in the range of 620 to 660 nm when irradiated with blue excitation light and also include a sulfide-based phosphor, preferably such as $SrGa_2S_4:Eu$, that emits green fluorescence having a peak wavelength in the range of 530 to 550 nm when irradiated with blue excitation light.

Examples of the oxide-based phosphor that may be used for producing white light by using a blue LED include an oxide-based phosphor, preferably such as $(Ba,Sr)_3SiO_5:Eu$ and $(Ba,Sr)_2SiO_4:Eu$, that emits red fluorescence at a wavelength in the range of 590 to 620 nm when irradiated with blue excitation light.

Additionally, any phosphor other than a sulfide-based phosphor or an oxide-based phosphor that may be used for producing white light by using a blue LED may also be adopted. For example, $(Y,Gd)_3(Al,Ga)_5O_{12}:Ce$, a sialon phosphor, or the like may be used.

Furthermore, the surface of a sulfide-based phosphor or an oxide-based phosphor is preferably coated. As compounds for coating the surface, for example, oxides, such as silicon oxide, yttrium oxide, aluminum oxide, and lanthanum oxide, may be used. These compounds may be used alone or in combination of two or more.

When a combination of phosphors as described above is used as the phosphor included in the single-layer light emitting sheet illustrated in FIG. 1, it is preferable to use a combination of a sulfide-based phosphor that emits red fluorescence having a wavelength in the range of 620 to 660 nm when irradiated with blue excitation light or an oxide-based phosphor that emits red fluorescence having a wavelength in the range of 590 to 620 nm when irradiated with blue excitation light, and a sulfide-based phosphor that emits green fluorescence having a wavelength in the range of 530 to 550 nm when irradiated with blue excitation light, in order to cause the phosphor sheet to produce white light. A combination of CaS:Eu or $(BaSr)_3SiO_5$:Eu that emits red fluorescence and $SrGa_2S_4$:Eu that emits green fluorescence is especially preferred.

The resin composition from which the phosphor layer is formed contains a resin component, which is preferably either a polyolefin copolymer component or a photo-curing (meth)acryl resin component.

Examples of the polyolefin copolymer include a styrene-based copolymer or a hydrogenated substance thereof. Such a styrene-based copolymer or a hydrogenated substance thereof preferably includes a styrene-ethylene-butylene-styrene block copolymer or a hydrogenated substance thereof, and a styrene-ethylene-propylene block copolymer or a hydrogenated substance thereof. Especially, a hydrogenated substance of a styrene-ethylene-butylene-styrene block copolymer is preferred because of its transparency and gas barrier properties. By incorporating such a polyolefin copolymer component, excellent light stability and reduced water absorption properties are achieved.

Examples of the photo-curing acrylate resin component include urethane (meth)acrylate, polyester (meth)acrylate, epoxy (meth)acrylate, or the like, and especially, urethane (meth)acrylate is preferred because of its heat resistance after photo-curing. By incorporating such a photo-curing (meth)acrylate resin component, excellent light stability and reduced water absorption properties are achieved.

Additionally, other light transmissive resins, color pigments, solvents, or the like may also be blended in the resin composition as needed as long as they do not impart the advantageous effect of the present disclosure.

The moisture vapor barrier films 12 and 13 each are a gas barrier film including a substrate or film made of plastic, such as PolyEthylene Terephthalate (PET), and a thin film that is formed on a surface of the plastic substrate or film and that is made of a metallic oxide, such as aluminum oxide, magnesium oxide, and silicon oxide. Any film having a multi-layer structure, such as PET/SiOx/PET, may also be used.

In the phosphor sheet according to the present embodiment, the edge portion of the first moisture vapor barrier film 12 and the edge portion of the second moisture vapor barrier film 13 are sealed by the cover member 14 having a moisture vapor transmission rate of 1 $g/m^2$/day or less.

Examples of the cover member 14 include an adhesive tape including a substrate 141 that has a moisture vapor transmission rate of 1 $g/m^2$/day or less and that is coated with an adhesive 142. As the substrate 141, metallic foil, such as aluminum foil, and the moisture vapor barrier films 12 and 13 may be used. The aluminum foil may be shiny white aluminum or matte black aluminum, and when a pleasant color hue is desired in the edge portion of the phosphor sheet, white aluminum is preferred. The cover member 14 applied onto the moisture vapor barrier films has a width W that is in the range of preferably from 1 mm to 10 mm, more preferably from 1 mm to 5 mm in consideration of water vapor barrier properties and strength. The cover member 14 with the above structure prevents moisture vapor from entering the phosphor layer from the edge portions of the moisture vapor barrier films, and accordingly, prevents deterioration in phosphor(s) included in the phosphor layer.

Second Structural Example

Figure 2:
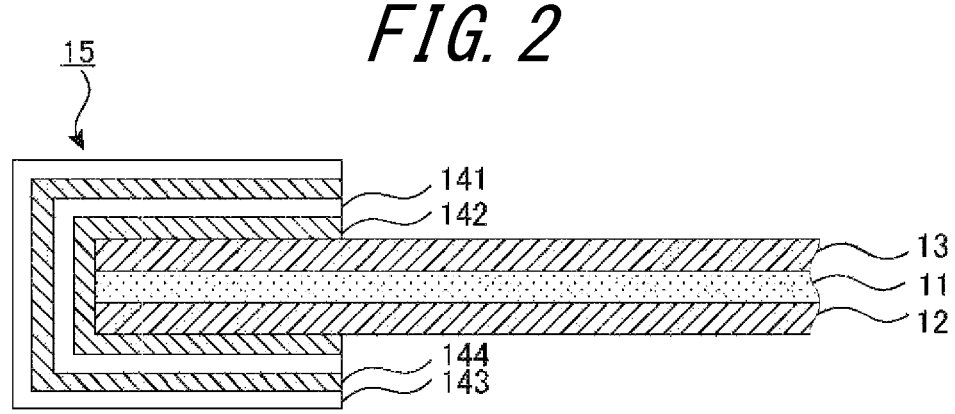
FIG. 2 illustrates the second structural example of an edge portion of a phosphor sheet.

FIG. 2 illustrates the second structural example of an edge portion of a phosphor sheet. As in the first structural example, the illustrated phosphor sheet includes the phosphor layer 11 sandwiched between the first moisture vapor barrier film 12 and the second moisture vapor barrier film 13.

A cover member 15 in the second structural example includes an adhesive tape, which includes the substrate 141 coated with the adhesive 142, and a phosphor tape applied onto the adhesive tape. The phosphor tape includes a phosphor layer 143 that constitutes the second phosphor layer and that is coated with an adhesive 144.

The phosphor layer 143 included in the phosphor tape is obtained by forming a powdered phosphor-containing resin composition into a film, and the phosphor layer 143 serves to correct the color hue in the vicinity of the edge portion resulting from the application of the adhesive tape to the substrate 141. Similarly to the phosphor layer 11 included in the phosphor sheet, materials of the phosphor included in the phosphor layer 143 are not limited to any particular type. However, since the phosphor is located on an outer side of the moisture vapor barrier films 11, 12, a water resistant phosphor, such as a YAG-based phosphor and a nitride-based phosphor, is preferably used. Especially when white light is to be produced by using a blue LED, a yellow YAG-based phosphor, such as $(Y,Gd)_3(Al,Ga)_5O_{12}$:Ce (YAG:Ce), is preferred. The use of such a yellow YAG-based phosphor cancels blueness in the vicinity of the edge portion of the phosphor sheet.

By thus applying the phosphor tape onto the adhesive tape, the color hue in the vicinity of the edge portion resulting from the application of the adhesive tape to the substrate 141 is corrected to bring the color hue to closer to that in a middle portion. Additionally, the cover member 15 in the second structural example may also be formed as a tape into which the substrate 141 and the phosphor layer 143 are integrated.

Third Structural Example

Figure 3:
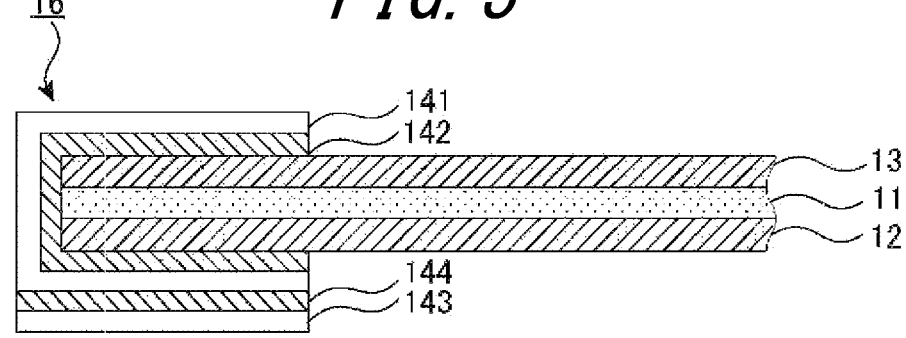
FIG. 3 illustrates the third structural example of an edge portion of a phosphor sheet.

FIG. 3 illustrates the third structural example of an edge portion of a phosphor sheet. As in the first structural example, the illustrated phosphor sheet includes the phosphor layer 11 sandwiched between the first moisture vapor barrier film 12 and the second moisture vapor barrier film 13.

A cover member 16 in the third structural example includes an adhesive tape, which includes the substrate 141 coated with the adhesive 142, and a phosphor tape applied only on one surface side of the phosphor sheet. The phosphor tape includes the additional phosphor layer 143 coated with the adhesive 144. Similarly to the cover member 15 in the second structural example, the cover member 16 with the above structure corrects the color hue in the vicinity of the edge portion to bring the color hue to closer to that in the middle portion. Moreover, the cover member 16 allows the edge portion of the phosphor sheet to be thinner than it is with the cover member 15 in the second structural example.

Fourth Structural Example

Figure 4:
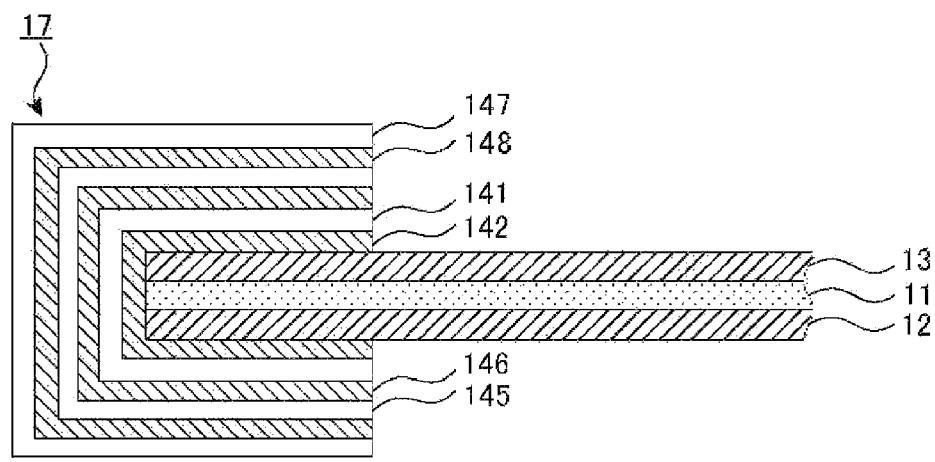
FIG. 4 illustrates the fourth structural example of an edge portion of a phosphor sheet.

FIG. 4 illustrates the fourth structural example of an edge portion of a phosphor sheet. As in the first structural example, the illustrated phosphor sheet includes the phosphor layer 11 sandwiched between the first moisture vapor barrier film 12 and the second moisture vapor barrier film 13.

A cover member 17 in the fourth structural example includes an adhesive tape, which includes the substrate 141 coated with the adhesive 142, a reflective tape applied onto the adhesive tape, and a phosphor tape applied onto the reflective tape. The reflective tape includes a reflective layer 145 coated with an adhesive 146. The phosphor tape includes an additional phosphor layer 147 to which an adhesive 148 is attached. By applying the reflective tape onto the adhesive tape, the color hue in the vicinity of the edge portion is corrected to be closer to that in the middle portion even when, for example, matte black aluminum foil is used as the substrate 141. Additionally, the cover member 17 in the forth structural example may also be formed as a tape into which the substrate 141, the reflective layer 145, and the phosphor layer 147 are integrated in the stated order.

Fifth Structural Example

A cover member 18 in the fifth structural example includes an adhesive tape, which includes the substrate 141 coated with the adhesive 142, and a reflective tape and a phosphor tape that are applied only on one surface side of the phosphor sheet. The reflective tape includes the reflective layer 145 coated with the adhesive 146. The phosphor tape includes the additional phosphor layer 147 to which the adhesive 148 is attached. Similarly to the cover member 17 in the fourth structural example, the cover member 18 with the above structure corrects the color hue in the vicinity of the edge portion to bring the color hue to closer to that in the middle portion. Moreover, the cover member 18 allows the edge portion of the phosphor sheet to be thinner than it is with the cover member 17 in the fourth structural example.

[Method of Manufacturing Phosphor Sheet]

Figure 6:
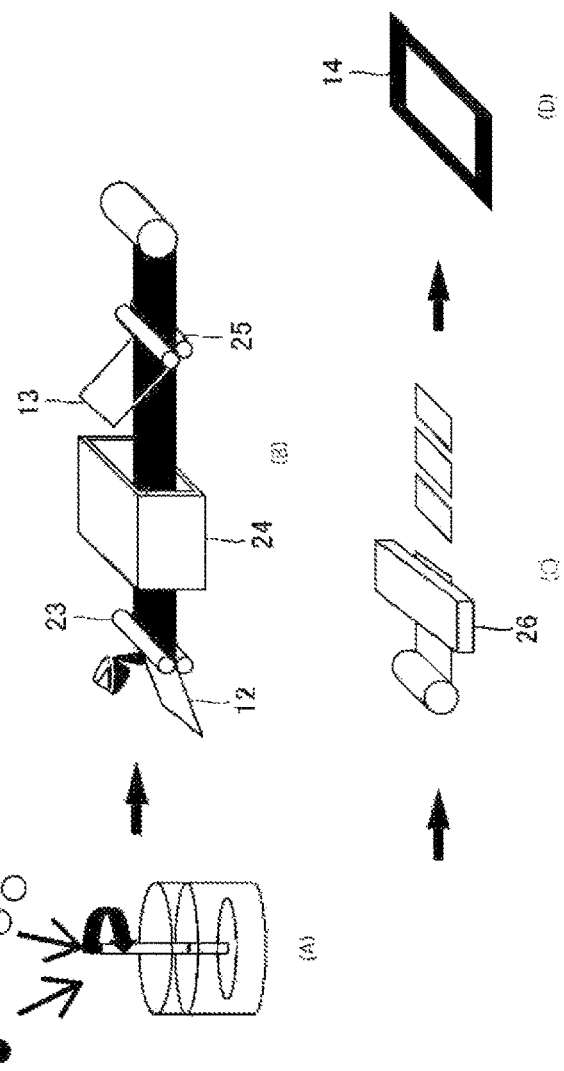
FIG. 6 is a schematic view for illustrating an exemplary method of manufacturing a phosphor sheet.

FIG. 6 is a schematic view for illustrating an exemplary method of manufacturing a phosphor sheet. As illustrated in FIG. 6, the concrete example of a method of manufacturing a phosphor sheet includes a stirring step (A), a lamination step (B), a punching step (C), and a sealing step (D).

In the stirring step (A), a red phosphor 21 and a green phosphor 22 are added, in a predetermined compounding ratio, into, for example, a resin paste dissolved in a solvent, and thus, a phosphor-containing resin paste is prepared. In the lamination step (B), the phosphor resin paste is applied onto the first water vapor barrier film 12, the thickness of the phosphor resin paste is made uniform by using a bar coater 23, and the phosphor resin paste is dried in an oven 24, and thus, the phosphor layer 11 is formed. Then, the second water vapor barrier film 13 is applied onto the phosphor layer 11 by using a heat laminator 25 to obtain a raw material of the phosphor sheet including the phosphor layer 11 sandwiched between the first and second moisture vapor barrier films 12 and 13. In the punching step (C), the raw material of the phosphor sheet is punched by a pressing machine 26 to obtain the phosphor sheet of a predetermined size. At this stage, the phosphor layer is exposed on lateral surfaces of the edge portion of the phosphor sheet. In the sealing step (D), the phosphor layer exposed between the first water vapor barrier film and the second water vapor barrier film is sealed by using, for example, an aluminum foil tape as the cover member 14.

The above steps (A) through (D) are used to manufacture the phosphor sheet in which the edge portions of the first and second water vapor barrier films 12 and 13 are sealed by the cover member 14.

2. Lighting Device

Figure 7:
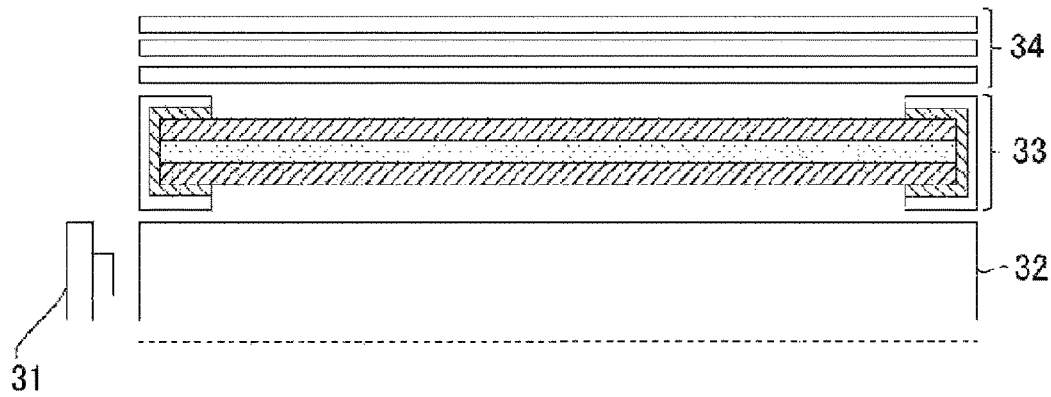
FIG. 7 is a schematic sectional view of an edge-lit lighting device.

FIG. 7 is a schematic sectional view of an edge-lit lighting device. As illustrated in FIG. 7, the lighting device employs an "edge-lit backlight" including a blue LED 31, a light guide panel 32 that diffuses blue light introduced from the blue LED 31 to the light guide panel 32 through an edge surface of the light guide panel 32, a phosphor sheet 33 that produces white light from blue light, and an optical film 34.

The blue LED 31 includes a so-called "LED package" having, for example, an InGaN-based LED chip as a blue light emitting device. The light guide panel 32 may be formed by a transparent substrate, such as an acryl plate, that evenly diffuses the light introduced from the edge surface for surface emission. The phosphor sheet 33 includes a powdered phosphor that produces white light from blue light emitted from the blue light emitting device. The phosphor powder used herein has an average particle diameter of several μm to several tens of μm. This enhances light scattering effect of the phosphor sheet 33. The optical film 34 may be a reflective polarizer film, a diffusion film, or the like used for improving visibility of the liquid crystal display device.

Figure 8:
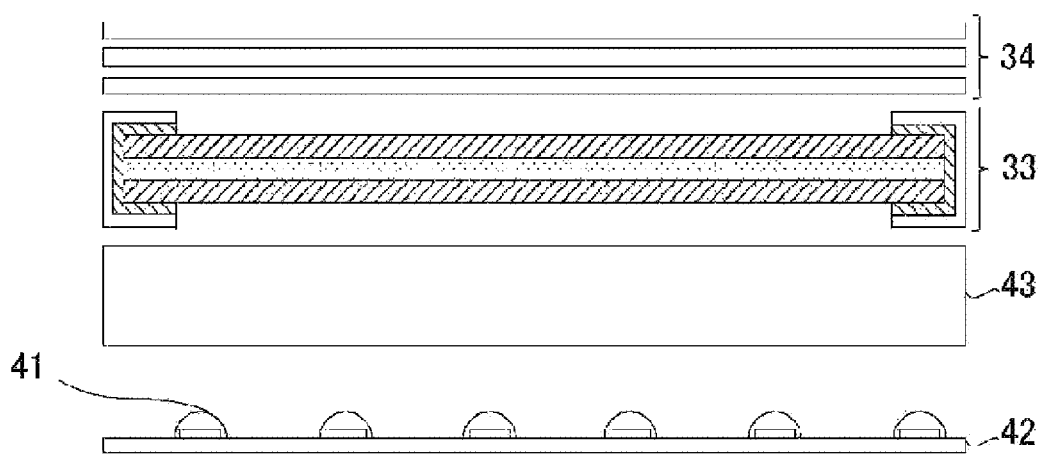
FIG. 8 is a schematic sectional view of a direct-lit lighting device.

FIG. 8 is a schematic sectional view of a direct-lit lighting device. As illustrated in FIG. 8, the lighting device employs a "direct-lit backlight" including a substrate 42 on which blue LEDs 41 are two-dimensionally arranged, a diffusion panel 43 that diffuses blue light from the blue LEDs 41, the phosphor sheet 33 that is arranged to be spaced apart from the substrate 42 and that produces white light from blue light, and the optical film 34.

Each blue LED 41 includes an "LED package" having, for example, an InGaN-based LED chip as a blue light emitting device. The substrate 42 may be a glass cloth substrate using a resin, such as phenol, epoxy, and polyimide, and the blue LEDs 41 are two-dimensionally arranged at an equal interval with a predetermined pitch on the substrate 42 in correspondence with the entire surface of the phosphor sheet 33. As needed, a surface of the substrate 42 on which the blue LEDs 41 are arranged may be subjected to reflective processing. The substrate 42 and the phosphor sheet 33 are arranged at a distance of approximately from 10 to 50 mm, and thus, the lighting device employs a "remote phosphor structure". The space between the substrate 42 and the phosphor sheet 33 is maintained by a plurality of support columns and a reflective plate in a manner such that four sides of the space formed between the substrate 42 and the phosphor sheet 33 are surrounded by the support columns and the reflective plate. The diffusion panel 43 serves to diffuse light emitted from the blue LEDs 41 over a broad area so that the shape of the light source becomes invisible, and the diffusion panel 43 has a total light transmission rate, for example, in the range from 20% or more to 80% or less.

In the lighting device with the above structure, the edge portion of the phosphor sheet 33 is sealed by the cover member, and accordingly, a sulfide-based phosphor, an oxide-based phosphor, or a combination of these phosphors which are prone to deterioration due to moisture vapor may be preferably used.

Figure 9:
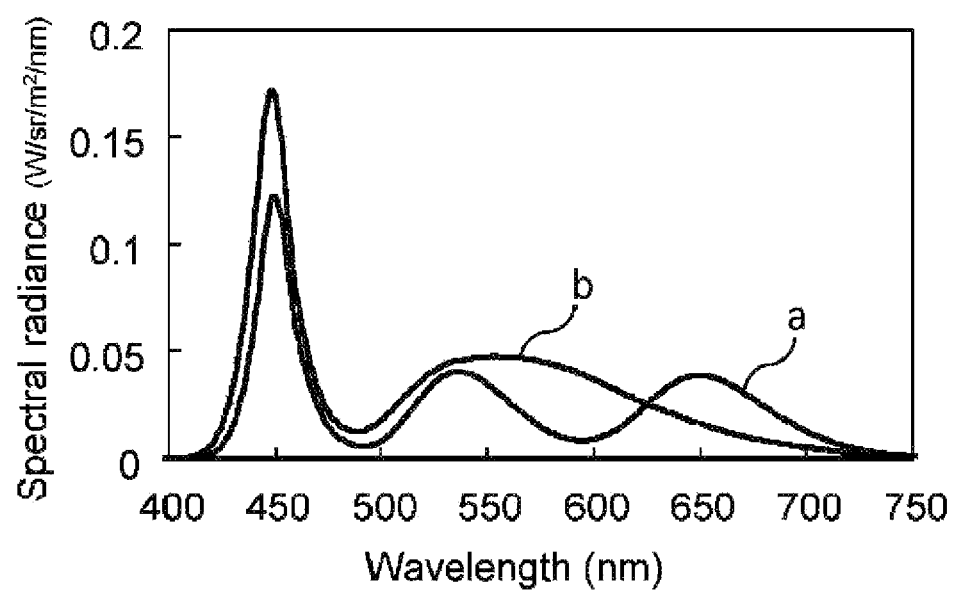
FIG. 9 illustrates spectra of a backlight using a sulfide-based phosphor and a conventional backlight using a yellow phosphor.

FIG. 9 illustrates spectra of a backlight using a sulfide-based phosphor and a conventional backlight using a yellow phosphor. In FIG. 9, a line a represents a spectrum of the backlight using a sulfide-based phosphor, and a line b represents a spectrum of the conventional backlight using a yellow phosphor.

Figure 10:
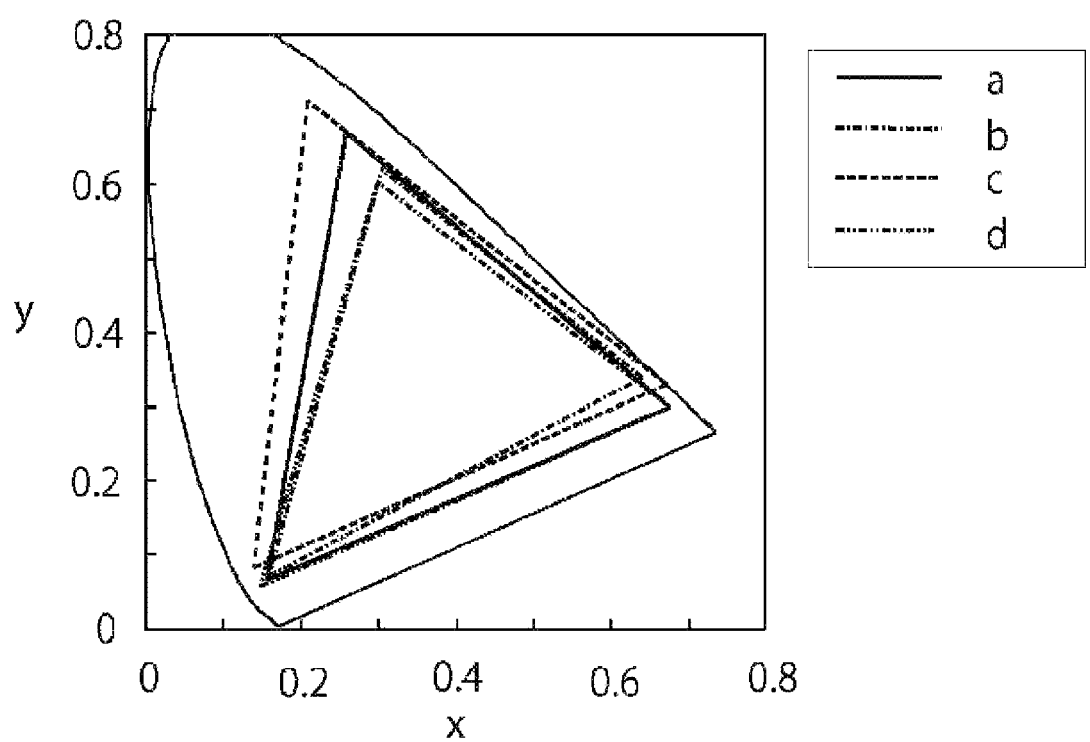
FIG. 10 is a CIE1931 chromaticity diagram illustrating color space of a backlight using a sulfide-based phosphor and a conventional backlight using a yellow phosphor.

FIG. 10 is a CIE1931 chromaticity diagram illustrating color space of liquid crystal display devices including a backlight using a sulfide-based phosphor and a conventional backlight using a yellow phosphor. In FIG. 10, reference numeral a denotes color space of a liquid crystal display device including a backlight using a sulfide-based phosphor, reference numeral b denotes color space of a conventional backlight using a yellow phosphor, reference numeral c denotes color space used by the NTSC system (i.e., the NTSC color space), and reference numeral d denotes the sRGB color space.

The backlight using a sulfide-based phosphor included a phosphor sheet formed by using, as the sulfide-based phosphor, a combination of a green sulfide-based phosphor ($SrGa_2S_4$:Eu) and a red sulfide-based phosphor (CaS:Eu) which are dispersed in a Styrene-Ethylene-Butylene-Styrene block (SEBS) resin.

Since the sulfide-based phosphor-containing phosphor sheet included the red sulfide-based phosphor, as illustrated in FIG. 9, the spectrum a of the backlight using the sulfide-based phosphor exhibits greater intensity at around 650 nm compared with the spectrum b of the backlight using the yellow phosphor. Furthermore, as illustrated in FIG. 10, an area ratio of the color space of the liquid crystal display device including the backlight using the sulfide-based phosphor in the NTSC color space is in the range approximately from 85 to 90%, while an area ratio of the color space of the liquid crystal display device including the backlight using the yellow phosphor in the NTSC color space is approximately 72%. The area ratio is determined by a product of a spectrum of a backlight and a spectral transmission factor of a color filter included in the liquid crystal display device. Note that the value of the area ratio may slightly vary depending on the latter parameter, namely, the spectral transmission factor of a color filter.

In this way, the phosphor sheet using a sulfide-based phosphor is capable of representing a broad range of colors, and accordingly, the technique according to the embodiments herein of preventing entrance of moisture vapor by sealing the edge portion of the phosphor sheet by the cover member is very useful in the phosphor sheet using a sulfide-based phosphor. Furthermore, by arranging a lighting device including the phosphor sheet using a sulfide-based phosphor, for example, on a liquid crystal panel serving as a display screen of a liquid crystal display device, a broad range of colors is represented, and the liquid crystal display device is imparted with a longer life.

The present disclosure is not limited to the aforementioned embodiments. Needless to say, various changes may be made to the embodiments without departing from the gist of the present disclosure. For example, although in the aforementioned embodiments the lighting device is used as a backlight light source of a display device, the lighting device may be used as an illumination light source. When the lighting device is used as an illumination light source, the optical film 34 may be omitted in many cases. Furthermore, the phosphor-containing resin does not need to be formed into a flat sheet and may have a three-dimensional shape such as a cup shape.

EXAMPLES

3. Examples

The present disclosure will be described concretely below with reference to Examples. For each Example, a phosphor sheet including a phosphor layer that is sandwiched between moisture vapor barrier films was manufactured, and the manufactured phosphor sheet was assessed in terms of deterioration in phosphor(s) in an edge portion (edge portion) of the phosphor sheet and chromaticity variations in the edge portion of the phosphor sheet. However, the present disclosure is not limited to the Examples.

[Assessment of Deterioration in Phosphor(s)]

The phosphor sheet was stored for 1000 H in a 60° C./90% humidity environment, and subsequently, the edge portion of the phosphor sheet was visually checked to determine whether any color change was observed. In the assessment of deterioration in phosphor(s), the result was rated as "very good" when a color change was observed and as "poor" when a color change was not observed.

[Assessment of Chromaticity Variations]

Figure 11:
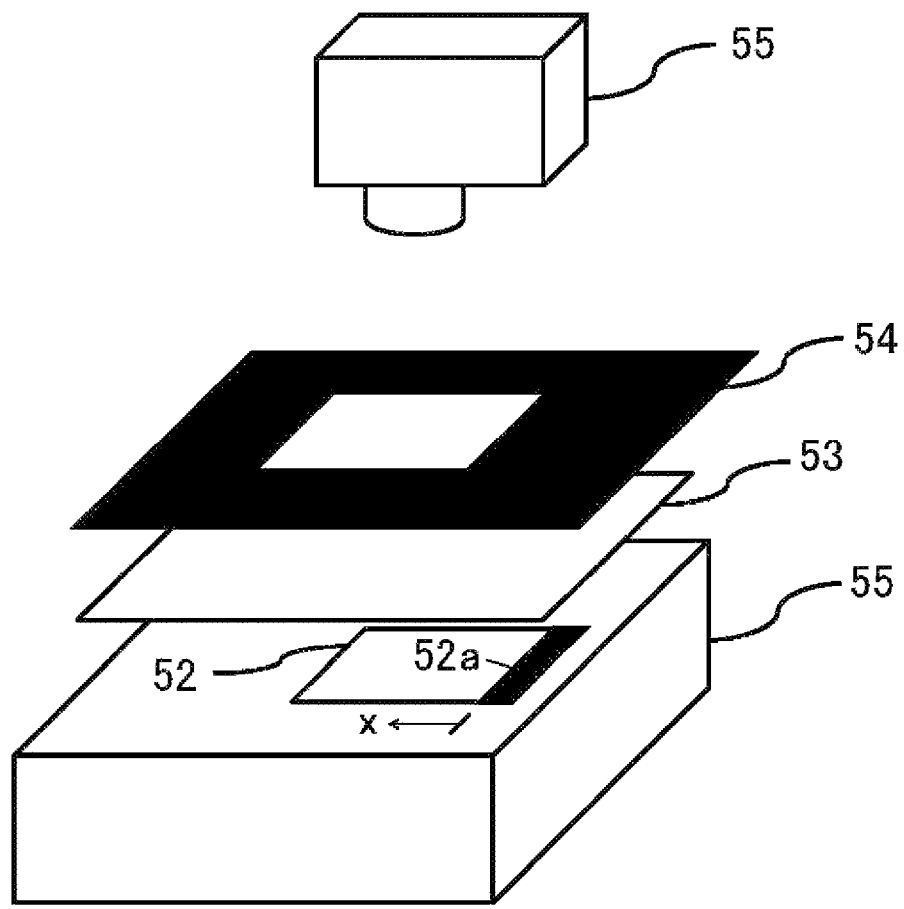
FIG. 11 is a schematic view illustrating how the chromaticity of a phosphor sheet is measured.

FIG. 11 is a schematic view illustrating how the chromaticity of a phosphor sheet is measured. On an edge-lit blue LED light guide panel 51, a phosphor sheet 52 and a set of optical films 53 were mounted in the stated order, and a black sheet 54 including an opening and having a size of 90 mm×45 mm was placed in a manner such that an edge portion of the opening aligned with an edge portion of the cover member. Then, u'v' chromaticity (CIE 1976) was measured by a chromaticity camera 55 located on the side of the black sheet 54 including the opening.

A cover member 52a was applied to the phosphor sheet 52 as in the first to fifth structural examples illustrated in FIGS. 1 to 5. As illustrated in FIG. 11, the position on a moisture vapor barrier film in which the edge portion of the cover member 52a is located was defined as 0 (zero), and u'v' chromaticity (CIE 1976) in an X direction, which points to a middle portion of the phosphor sheet, was measured to calculate chrominance Δu'v' between the 0 mm position corresponding to the edge portion and the 10 mm position.

[Overall Assessment]

As overall assessment, the result was rated as "excellent" when the deterioration in phosphor(s) in the edge portion of the phosphor sheet was assessed as "very good" and the chrominance Δu'v' was 0.01 or less, as "very good" when the deterioration in phosphor(s) was assessed as "very good" and the chrominance Δu'v' was greater than 0.01 and less than 0.05, as "good" when the deterioration in phosphor(s) was assessed as "very good" and the chrominance Δu'v' was 0.05 or more, and as "poor" when the deterioration in phosphor(s) was assessed as "poor" regardless of chromaticity variations.

Example 1

A phosphor sheet of Example 1 was manufactured in accordance with the first structural example illustrated in FIG. 1, by sandwiching the phosphor layer between the moisture vapor barrier films each having a size of 100 mm×60 mm, and by sealing the edge portions of the moisture vapor barrier films by a matte black aluminum tape to form a frame width W of 3 mm in the edge portion of each moisture vapor barrier film. Thus, a display portion of the manufactured phosphor sheet has a three-layer structure.

As the moisture vapor barrier film, the one having the three-layer structure of Polyethylene terephthalate (PET)/SiOx/PET and having a film thickness of 38 μm was used. The moisture vapor barrier film exhibited a moisture vapor transmission rate of approximately 0.2 g/m²/day or less under the condition of temperature of 40° C. and humidity of 90%.

As the phosphor layer, the one in which a combination of a green sulfide-based phosphor ($SrGa_2S_4$:Eu) and a red sulfide-based phosphor (CaS:Eu) was dispersed in a Styrene-Ethylene-Butylene-Styrene block (SEBS) resin was used.

As the black aluminum tape, the one having a total thickness of 65 μm was used. The black aluminum tape included black aluminum foil that was made from aluminum foil coated on both surfaces with carbon black and that was approximately 50 μm in thickness, and an adhesive that was applied onto one surface of the black aluminum foil to a thickness of approximately 15 μm.

Figure 12:
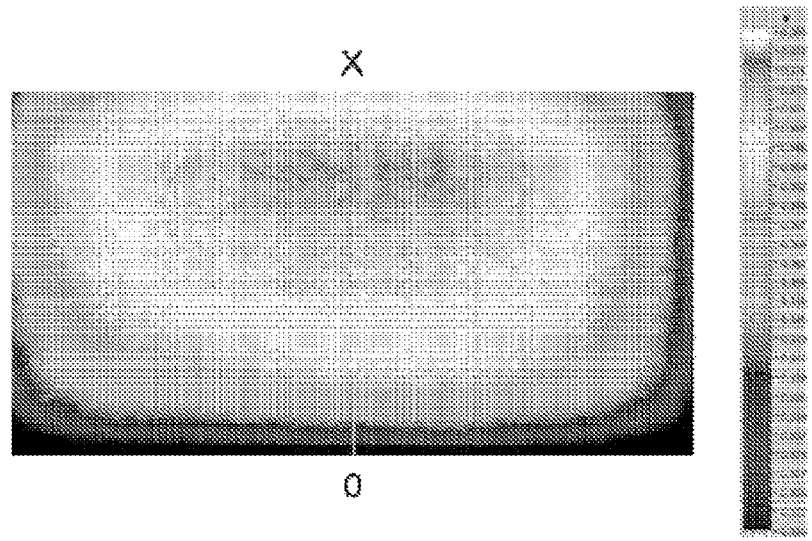
FIG. 12 illustrates a result of measurement of v' chromaticity (CIE 1976) in Example 1.
Figure 13:
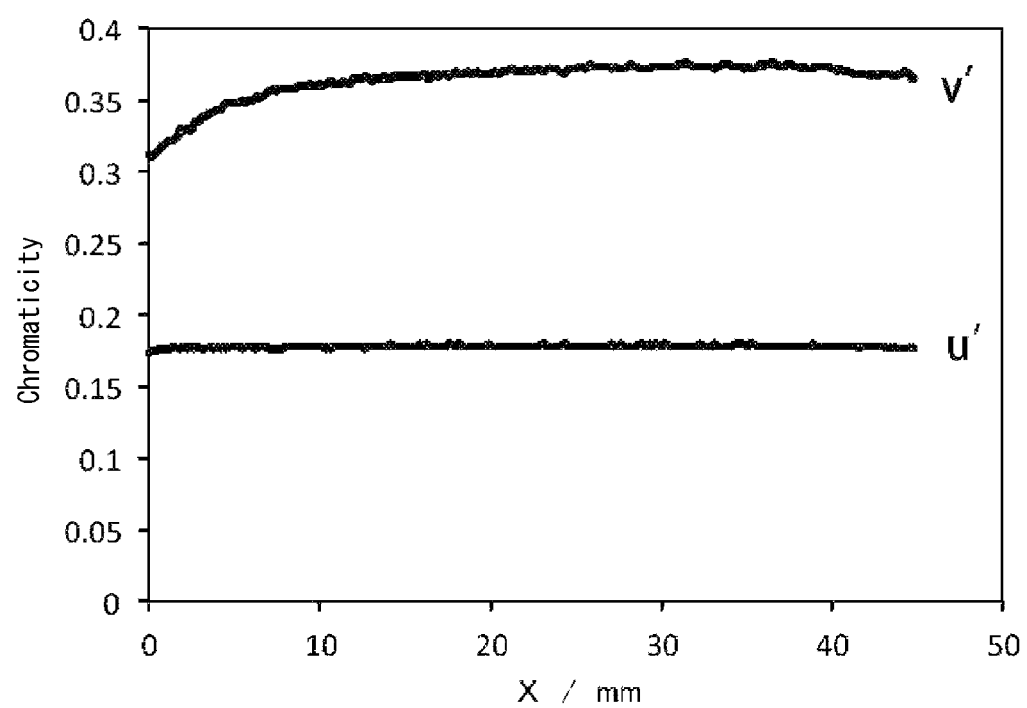
FIG. 13 is a graph illustrating u'v' chromaticity (CIE 1976) in an X direction from an edge portion of a phosphor sheet of Example 1.

FIG. 12 illustrates a result of measurement of v' chromaticity (CIE 1976) in Example 1. FIG. 13 is a graph illustrating u'v' chromaticity (CIE 1976) measured in the X direction from the edge portion of the phosphor sheet of Example 1. A large chrominance Δu'v' of 0.05 was observed between the 0 mm position corresponding to the edge portion and the 10 mm position. The reason is probably due to blueness appeared in the peripheral portion because the blue LED light guide panel 51 was larger than the sample of the phosphor sheet 53.

Table 1 shows results of the assessment of Example 1. In Example 1, the deterioration in phosphor(s) included in the phosphor sheet was assessed as "very good", the chrominance Δu'v' was 0.05, and the overall assessment was "good".

Example 2

A phosphor sheet of Example 2 was manufactured in accordance with the first structural example illustrated in FIG. 1 in the same manner as Example 1, except for that a shiny aluminum tape was used as the cover member. Thus, a display portion of the manufactured phosphor sheet has a three-layer structure.

As the shiny aluminum tape, the one having a total thickness of 65 μm was used. The shiny aluminum tape was made from aluminum foil that was approximately 50 μm in thickness, and an adhesive that was applied onto one surface of the aluminum foil to a thickness of approximately 15 μm.

Figure 14:
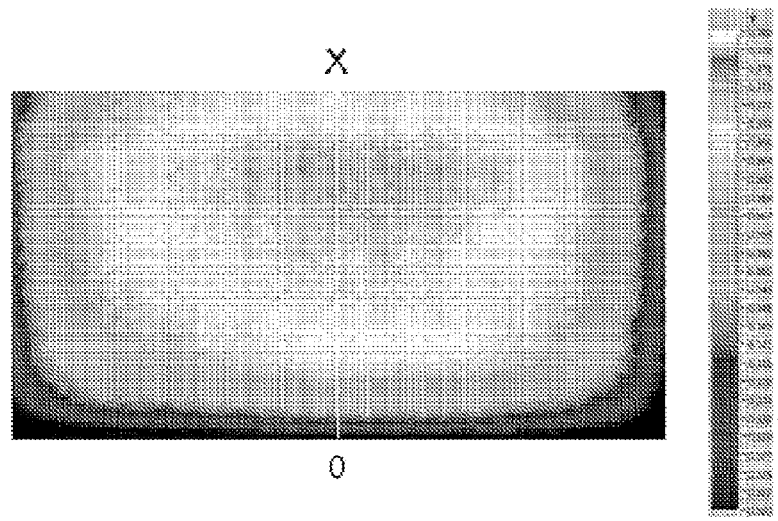
FIG. 14 illustrates a result of measurement of v' chromaticity (CIE 1976) in Example 2.
Figure 15:
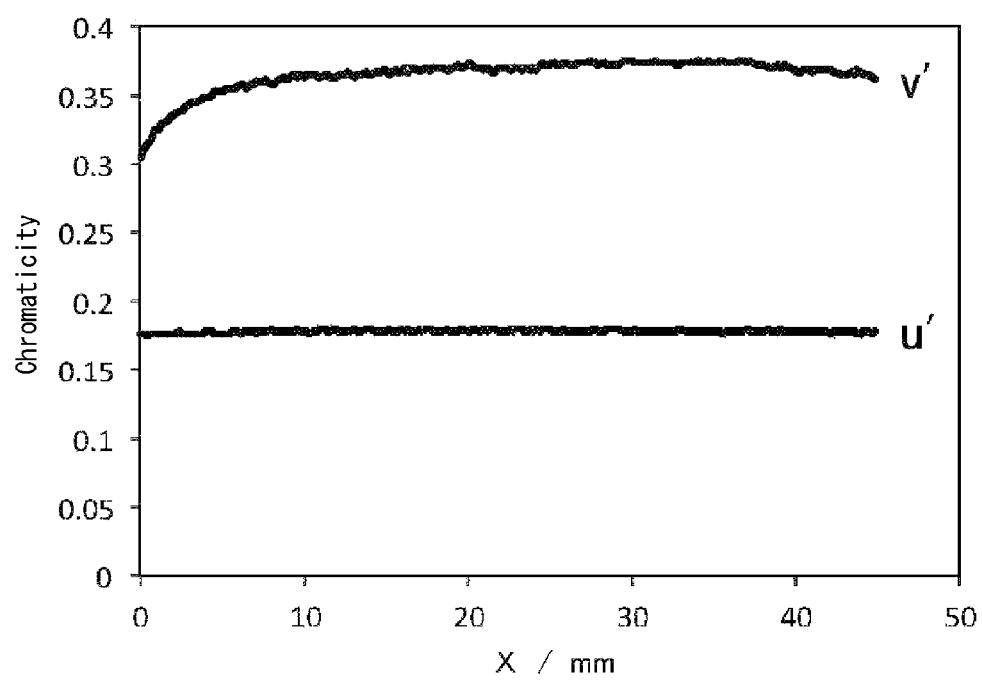
FIG. 15 is a graph illustrating u'v' chromaticity (CIE 1976) in the X direction from an edge portion of a phosphor sheet of Example 2.

FIG. 14 illustrates a result of measurement of v' chromaticity (CIE 1976) in Example 2. FIG. 15 is a graph illustrating u'v' chromaticity (CIE2976) measured in the X direction from the edge portion of the phosphor sheet of Example 2. A large chrominance Δu'v' of 0.06 was observed between the 0 mm position corresponding to the edge portion and the 10 mm position. The reason is probably due to blueness appeared in the peripheral portion because the blue LED light guide panel 51 was larger than the sample of the phosphor sheet 53.

Table 1 shows results of the assessment of Example 2. In Example 2, the deterioration in phosphor(s) included in the phosphor sheet was assessed as "very good", the chrominance Δu'v' was 0.06, and the overall assessment was "good".

Example 3

A phosphor sheet of Example 3 was manufactured in accordance with the second structural example illustrated in FIG. 2 in the same manner as Example 1, except for that the edge portions of the moisture vapor barrier films were sealed by a matte black aluminum tape to form a frame width W of 3 mm in the edge portion of each moisture vapor barrier film and that a YAG tape was applied on the black aluminum tape. Thus, a display portion of the manufactured phosphor sheet has a three-layer structure.

As the YAG tape, the one having a total thickness of 65 μm was used. The YAG tape was made from a phosphor film that was approximately 50 μm in thickness, and an adhesive that was applied onto one surface of the phosphor film to a thickness of approximately 15 μm.

A chrominance Δu'v' of 0.04 was observed between the 0 mm position corresponding to the edge portion and the 10 mm position. It has been found that the YAG tape reduces blueness in the peripheral portion due to the cover member.

Table 1 shows results of the assessment of Example 3. In Example 3, the deterioration in phosphor(s) included in the phosphor sheet was assessed as "very good", the chrominance Δu'v' was 0.04, and the overall assessment was "very good".

Example 4

A phosphor sheet of Example 4 was manufactured in accordance with the second structural example illustrated in FIG. 2 in the same manner as Example 2, except for that the edge portions of the moisture vapor barrier films were sealed by a shiny aluminum tape to form a frame width W of 3 mm in the edge portion of each moisture vapor barrier film and that a YAG tape was applied on the aluminum tape. Thus, a display portion of the manufactured phosphor sheet has a three-layer structure. The same YAG tape as that in Example 3 was used.

Figure 16:
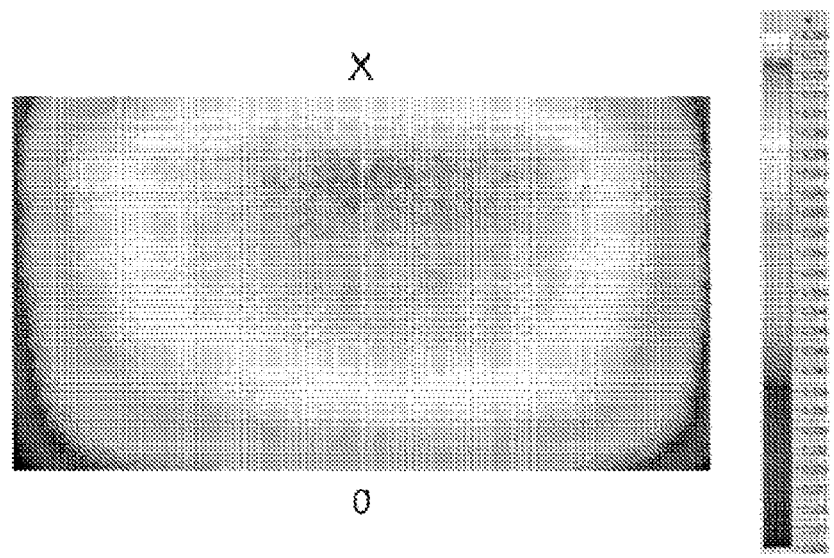
FIG. 16 illustrates a result of measurement of v' chromaticity (CIE 1976) in Example 4.
Figure 17:
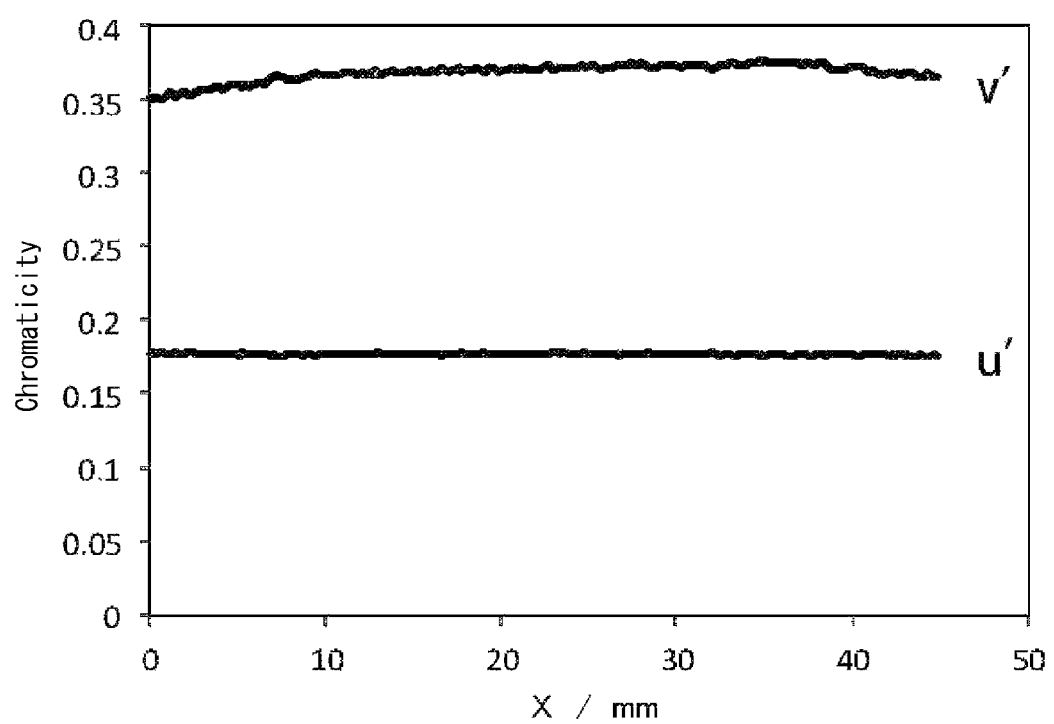
FIG. 17 is a graph illustrating u'v' chromaticity (CIE 1976) in the X direction from an edge portion of a phosphor sheet of Example 4.

FIG. 16 illustrates a result of measurement of v' chromaticity (CIE 1976) in Example 4. FIG. 17 is a graph illustrating u'v' chromaticity (CIE 1976) measured in the X direction from the edge portion of the phosphor sheet of Example 4. A chrominance Δu'v' of 0.01 was observed between the 0 mm position corresponding to the edge portion and the 10 mm position. It has been found that the shiny aluminum tape and the YAG tape reduce blueness in the peripheral portion due to the cover member.

Table 1 shows results of the assessment of Example 4. In Example 4, the deterioration in phosphor(s) included in the phosphor sheet was assessed as "very good", the chrominance Δu'v' was 0.01, and the overall assessment was "excellent".

Example 5

Figure 5:
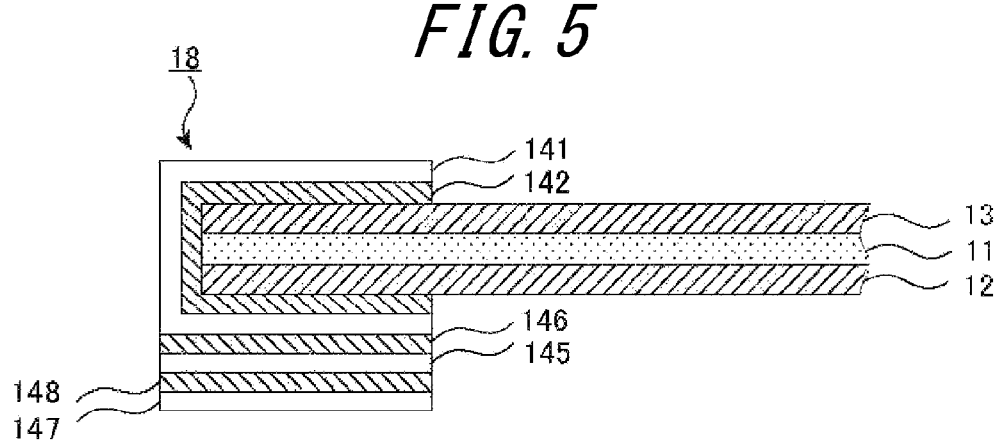
FIG. 5 illustrates the fifth structural example of an edge portion of a phosphor sheet.

A phosphor sheet of Example 5 was manufactured in accordance with the fifth structural example illustrated in FIG. 5 in the same manner as Example 1, except for that the edge portions of the moisture vapor barrier films were sealed by a matte black aluminum tape to form a frame width W of 3 mm in the edge portion of each moisture vapor barrier film and that a reflective tape and a YAG tape were applied only on the side of the blue LED light guide panel 51. Thus, a display portion of the manufactured phosphor sheet has a three-layer structure.

As the reflective tape, the one having a total thickness of 65 μm was used. The reflective tape was made from a white reflective plate that was approximately 50 μm in thickness, and an adhesive that was applied onto one surface of the white reflective plate to a thickness of approximately 15 μm. The same YAG tape as that in Example 3 was used.

Figure 18:
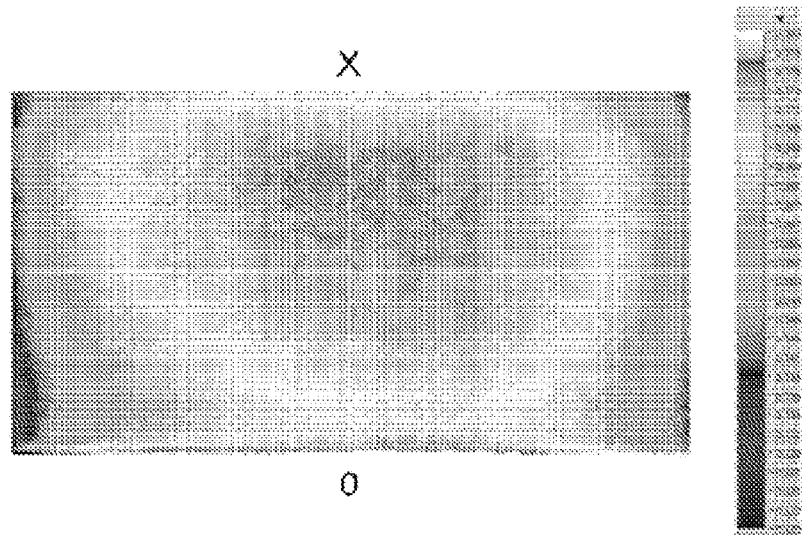
FIG. 18 illustrates a result of measurement of v' chromaticity (CIE 1976) in Example 5.
Figure 19:
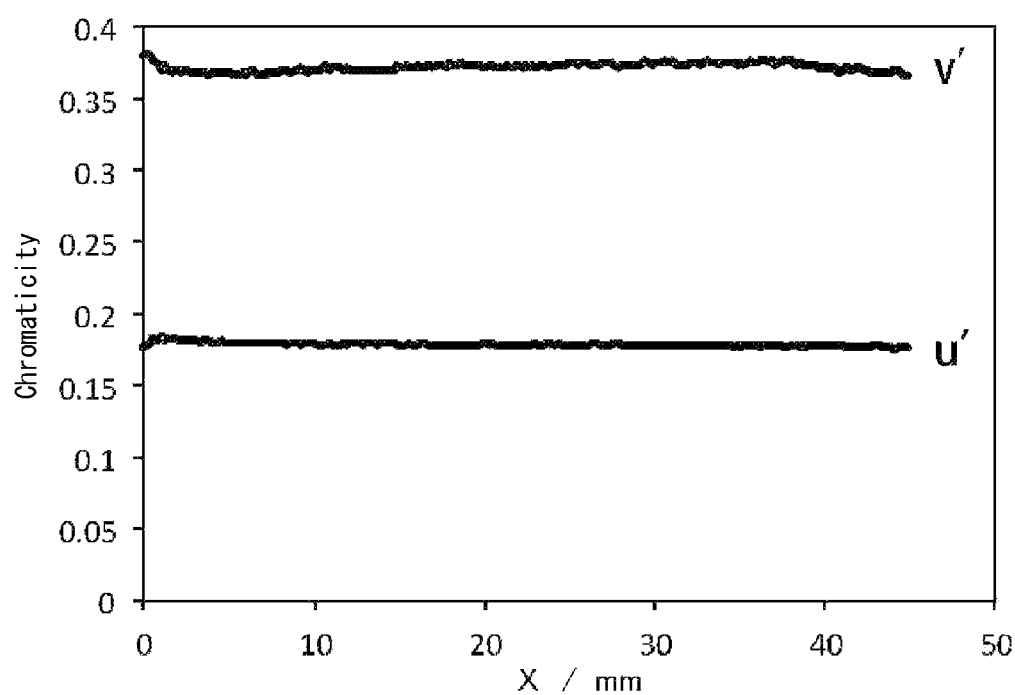
FIG. 19 is a graph illustrating u'v' chromaticity (CIE 1976) in the X direction from an edge portion of a phosphor sheet of Example 5.

FIG. 18 illustrates a result of measurement of v' chromaticity (CIE 1976) in Example 5. FIG. 19 is a graph illustrating u'v' chromaticity (CIE 1976) measured in the X direction from the edge portion of the phosphor sheet of Example 5. A chrominance Δu'v' of 0.01 was observed between the 0 mm position corresponding to the edge portion and the 10 mm position. Using the reflective tape further improved blueness in the peripheral portion due to the cover member than in Example 3 for which the matte black aluminum tape and the YAG tape were used.

Table 1 shows results of the assessment of Example 5. In Example 5, the deterioration in phosphor(s) included in the phosphor sheet was assessed as "very good", the chrominance Δu'v' was 0.01, and the overall assessment was "excellent".

Example 6

A phosphor sheet of Example 6 was manufactured in accordance with the fifth structural example illustrated in FIG. 5 in the same manner as Example 2, except for that the edge portions of the moisture vapor barrier films were sealed by a shiny aluminum tape to form a frame width W of 3 mm in the edge portion of each moisture vapor barrier film and that a reflective tape and a YAG tape were applied only on the side of the blue LED light guide panel 51. Thus, a display portion of the manufactured phosphor sheet has a three-layer structure. The same YAG tape as that in Example 3 was used, and the same reflective tape as that in Example 5 was used.

Figure 20:
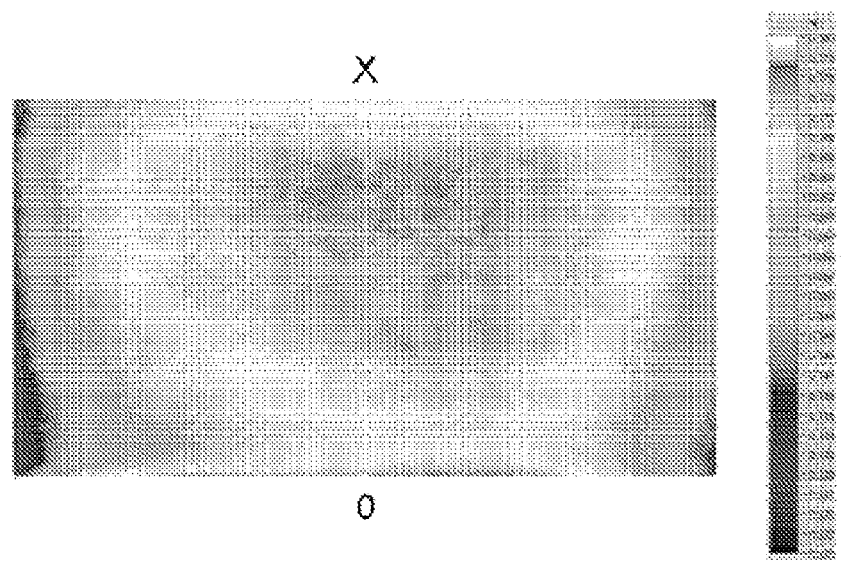
FIG. 20 illustrates a result of measurement of v' chromaticity (CIE 1976) in Example 6.
Figure 21:
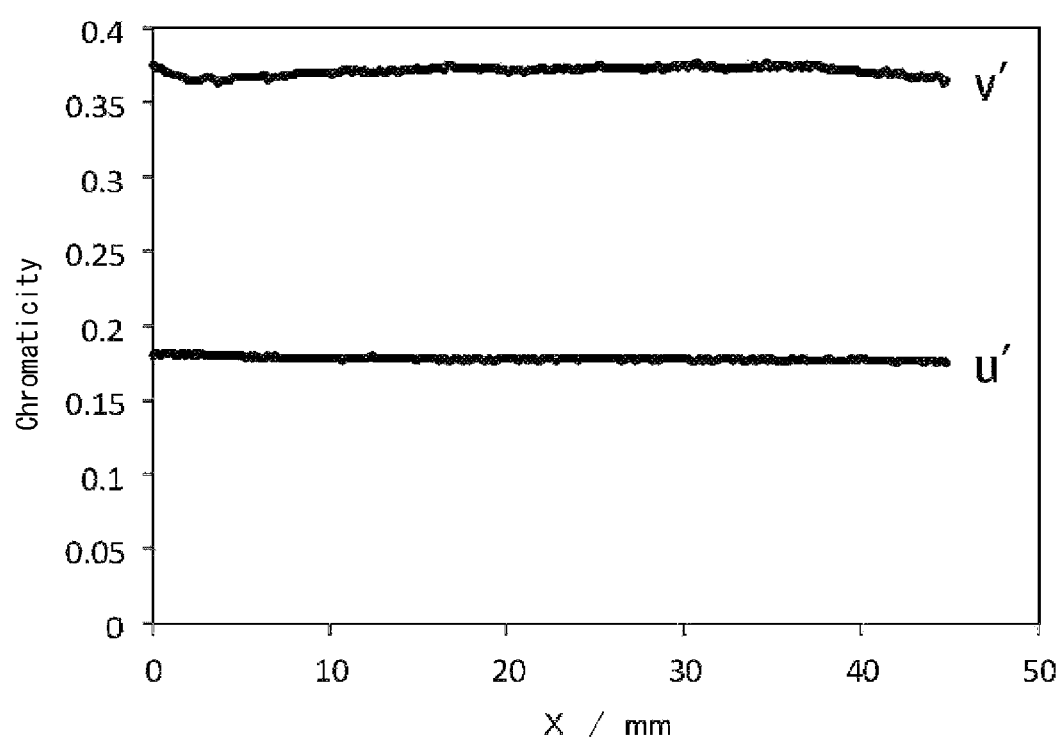
FIG. 21 is a graph illustrating u'v' chromaticity (CIE 1976) in the X direction from an edge portion of a phosphor sheet of Example 6.

FIG. 20 illustrates a result of measurement of v' chromaticity (CIE 1976) in Example 6. FIG. 21 is a graph illustrating u'v' chromaticity (CIE 1976) measured in the X direction from the edge portion of the phosphor sheet of Example 6. A chrominance Δu'v' of 0.006 was observed between the 0 mm position corresponding to the edge portion and the 10 mm position. Similarly to Example 4 for which the shiny aluminum tape and the YAG tape were used, blueness in the peripheral portion due to the cover member was improved.

Table 1 shows results of the assessment of Example 6. In Example 6, the deterioration in phosphor(s) included in the phosphor sheet was assessed as "very good", the chrominance Δu'v' was 0.006, and the overall assessment was "excellent".

Example 7

A phosphor sheet of Example 7 was manufactured in accordance with the fourth structural example illustrated in FIG. 4 in the same manner as Example 2, except for that the edge portions of the moisture vapor barrier films were sealed by a shiny aluminum tape to form a frame width W of 3 mm in the edge portion of each moisture vapor barrier film and that a reflective tape and a YAG tape were applied on the aluminum tape. Thus, a display portion of the manufactured phosphor sheet has a three-layer structure. The same YAG tape as that in Example 3 was used, and the same reflective tape as that in Example 5 was used.

A chrominance Δu'v' of 0.006 was observed between the 0 mm position corresponding to the edge portion and the 10 mm position. Similarly to Example 6 for which the reflective tape and the YAG tape were applied only on the side of the blue LED light guide panel 51, blueness in the peripheral portion due to the cover member was improved.

Table 1 shows results of the assessment of Example 7. In Example 7, the deterioration in phosphor(s) included in the phosphor sheet was assessed as "very good", the chrominance Δu'v' was 0.006, and the overall assessment was "excellent".

Comparative Example

A phosphor sheet of Comparative Example was manufactured in accordance with the first structural example illustrated in FIG. 1 in the same manner as Example 1, except for that the cover member 14 was omitted to leave the edge portions of the moisture vapor barrier films exposed. Thus, a display portion of the manufactured phosphor sheet had a three-layer structure.

Figure 22:
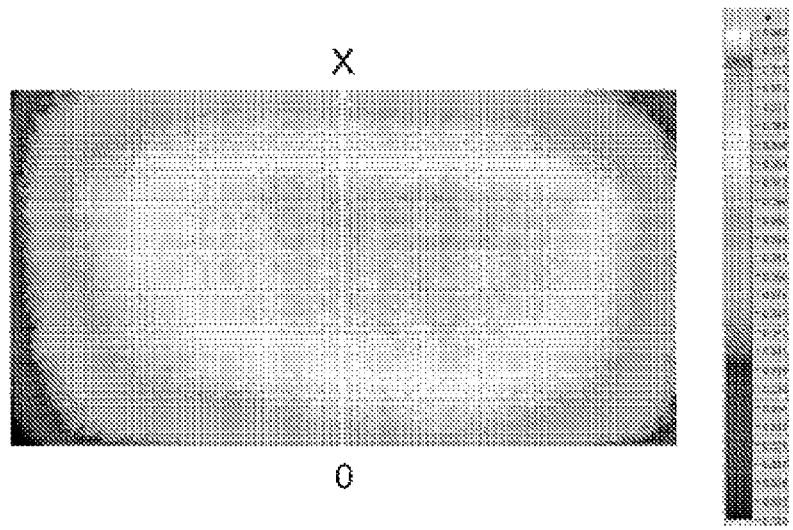
FIG. 22 illustrates a result of measurement of v' chromaticity (CIE 1976) in Comparative Example.
Figure 23:
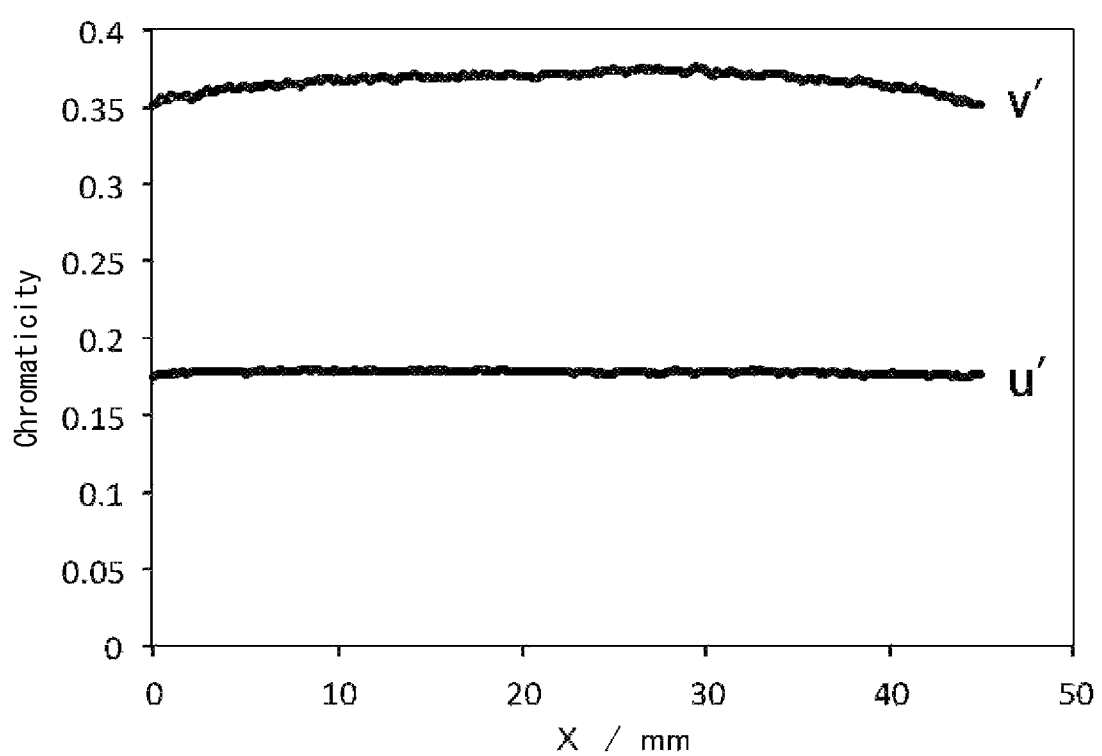
FIG. 23 is a graph illustrating u'v' chromaticity (CIE 1976) in the X direction from an edge portion of a phosphor sheet of Comparative Example.

FIG. 22 illustrates a result of measurement of v' chromaticity (CIE 1976) in Comparative Example. FIG. 23 is a graph illustrating u'v' chromaticity (CIE 1976) measured in the X direction from the edge portion of the phosphor sheet of Comparative Example. A chrominance Δu'v' of 0.02 was observed between the 0 mm position corresponding to the edge portion and the 10 mm position. Since the cover member was omitted, blue color variations due to the cover member were not observed in the peripheral portion. However, a color change in phosphor(s) was observed in the high temperature and high humidity environment test.

Table 1 shows results of the assessment of Comparative Example. In Comparative Example, although a favorable chrominance Δu'v' of 0.02 was observed, the deterioration in phosphor(s) included in the phosphor sheet was assessed as "poor", and the overall assessment was "poor".

Reference Example

A conventional phosphor sheet of Reference Example whose display portion had a seven-layer structure was manufactured. The phosphor sheet was manufactured by sandwiching the same phosphor layer as that in Example 1 between PET films each having a size of 94 mm×54 mm, by further sandwiching the PET films between moisture vapor barrier films each having a size of 100 mm×60 mm with use of a SEBS resin which was the same as that used in the phosphor layer, and by sealing the edge portions of the moisture vapor barrier films so that the edge portion of each moisture vapor barrier film had a pouch width W of 3 mm. Thus, a display portion of the manufactured phosphor sheet has the seven-layer structure. The same moisture vapor barrier films as those in Example 1 were used.

A chrominance Δu'v' of 0.002 was observed between the 0 mm position corresponding to the edge portion and the 10 mm position. Since the cover member was omitted, blue color variations due to the cover member were not observed in the peripheral portion. However, manufacturing of the phosphor sheet required many steps.

Table 1 shows results of the assessment of Reference Example. In Reference Example, the deterioration in phosphor(s) included in the phosphor sheet was assessed as "very good", the chrominance Δu'v' was 0.002, and the overall assessment was "excellent".

TABLE 1

| | Example 1 | Example 2 | Example 3 | Example 4 | Example 5 | Example 6 | Example 7 | Comparative Example | Reference Example |
|---|---|---|---|---|---|---|---|---|---|
| Component of cover member | Black aluminum tape | Shiny aluminum tape | Black aluminum tape/ YAG tape | Shiny aluminum tape/ YAG tape | Black aluminum tape/ reflective | Shiny aluminum tape/ reflective | Shiny aluminum tape/ reflective | None | Sealing member |

TABLE 1-continued

|  | Example 1 | Example 2 | Example 3 | Example 4 | Example 5 | Example 6 | Example 7 | Comparative Example | Reference Example |
|---|---|---|---|---|---|---|---|---|---|
| Position which YAG tape is applied | — | — | Entire edge portion | Entire edge portion | tape/ YAG tape One side of edge portion located closer to light guide panel | tape/ YAG tape One side of edge portion located closer to light guide panel | tape/ YAG tape Entire edge portion | — | — |
| Layer structure of display portion | Three layer | Three layer | Three layer | Thee layer | Three layer | Three layer | Three layer | Three layer | Seven layer |
| Assessment of deterioration in phosphor(s) | Very good | Very good | Very good | Very good | Very good | Very good | Very good | Poor | Very good |
| Chrominance Δ u'v' | 0.05 | 0.06 | 0.04 | 0.01 | 0.01 | 0.006 | 0.006 | 0.02 | 0.002 |
| Overall assessment | Good | Good | Very good | Excellent | Excellent | Excellent | Excellent | Poor | Excellent |

As shown by Examples 1 to 7, by sealing the edge portions of the moisture vapor barrier films by the cover member, entrance of moisture vapor is prevented, and deterioration in phosphor(s) is prevented with the simplified structure. Furthermore, as shown by Examples 3 to 7, the use of the phosphor tape prevents occurrence of blue color variations due to the cover member.

REFERENCE SIGNS LIST 11 phosphor layer
12 first moisture barrier film
13 second moisture barrier film
14,15,16,17,18 cover member
21 red phosphor
22 green phosphor
23 bar coater
24 oven
25 heat laminator
26 pressing machine
31 blue LED
32 light guide panel
33 phosphor sheet
34 optical film
41 blue LED
42 substrate
43 diffusion panel
51 blue LED light guide panel
52 phosphor sheet
53 set of optical films
54 black sheet including opening
55 chromaticity camera
141 substrate
142 adhesive
143 phosphor layer
144 adhesive
145 reflective layer
146 adhesive
147 phosphor layer
148 adhesive

The invention claimed is:

1. A phosphor sheet, comprising:
moisture vapor barrier films;
a first phosphor layer sandwiched between the moisture vapor barrier films; and
a cover member comprising a substrate layer, an adhesive layer adjacent the substrate layer, and a second phosphor layer on an opposite side of the substrate layer away from the adhesive layer, the cover member sealing an edge portion of each of the moisture vapor barrier films, and any edge portion of the first phosphor layer,
wherein the adhesive layer attaches the substrate layer to the edge portion of each of the moisture vapor barrier films,
wherein the substrate layer is arranged over and around the edge portion of each of the moisture vapor barrier films,
wherein the second phosphor layer is disposed on an edge portion of the phosphor sheet, on the outer side of the moisture vapor barrier films and the substrate layer, away from the first phosphor layer, and
wherein the second phosphor layer corrects a difference in color hue in the vicinity of the edge portion of the phosphor sheet, to bring the color hue closer to the color hue in the middle portion of the phosphor sheet.

2. The phosphor sheet of claim 1, wherein the first phosphor layer includes a phosphor that produces white light from blue light, and the second phosphor layer includes a yellow phosphor.

3. The phosphor sheet of claim 1, wherein the first phosphor layer includes a sulfide-based phosphor.

4. The phosphor sheet of claim 3, wherein the first phosphor layer includes a red phosphor and a green phosphor.

5. The phosphor sheet of claim 1, wherein the substrate layer of the cover member is aluminum foil.

6. The phosphor sheet of claim 1, wherein the second phosphor layer is arranged on only one side of the phosphor sheet.

7. The phosphor sheet of claim 1, wherein the cover member further comprises a reflective layer.

8. The phosphor sheet of claim 7, wherein the reflective layer is arranged on only one side of the phosphor sheet and on the same side as the second phosphor layer.

9. The phosphor sheet of claim 1, wherein the cover member has a moisture vapor transmission rate of 1 $g/m^2/$day or less.

10. A lighting device comprising the phosphor sheet of claim 1.

11. A liquid crystal display device comprising the phosphor sheet of claim 1.

12. The phosphor sheet of claim 1, wherein the second phosphor layer is arranged over and around the edge portion of each of the moisture vapor barrier films.

* * * * *